US012474419B2

(12) United States Patent
Shen et al.

(10) Patent No.: US 12,474,419 B2
(45) Date of Patent: Nov. 18, 2025

(54) DEVICE BASED ON ENSEMBLE NITROGEN-VACANCY CENTERS

(71) Applicant: UNIVERSITY OF SCIENCE AND TECHNOLOGY OF CHINA, Anhui (CN)

(72) Inventors: Mengze Shen, Anhui (CN); Zhiping Yang, Anhui (CN); Xi Kong, Anhui (CN); Fazhan Shi, Anhui (CN); Jiangfeng Du, Anhui (CN)

(73) Assignee: University of Science and Technology of China, Anhui (CN)

( * ) Notice: Subject to any disclaimer, the term of this patent is extended or adjusted under 35 U.S.C. 154(b) by 0 days.

(21) Appl. No.: 18/557,859

(22) PCT Filed: Mar. 28, 2022

(86) PCT No.: PCT/CN2022/083333
§ 371 (c)(1),
(2) Date: Oct. 27, 2023

(87) PCT Pub. No.: WO2023/184076
PCT Pub. Date: Oct. 5, 2023

(65) Prior Publication Data
US 2024/0219485 A1    Jul. 4, 2024

(51) Int. Cl.
*G01R 33/032*    (2006.01)
(52) U.S. Cl.
CPC ................... *G01R 33/032* (2013.01)
(58) Field of Classification Search
CPC ...... G01R 33/032; G01R 33/28; G01R 33/26; G01R 33/323; G01R 33/60; G01R 33/1284
(Continued)

(56) References Cited

U.S. PATENT DOCUMENTS 8,885,301 B1    11/2014  Heidmann
9,583,840 B1 *   2/2017  Lawrance .............. H01Q 15/04
(Continued)

FOREIGN PATENT DOCUMENTS

CN    201414675 Y  *  3/2010  .............. A47J 36/02
CN    108983121 A     12/2018
(Continued)

OTHER PUBLICATIONS

Alghannam et al., Engineering of Shallow Layers of Nitrogen Vacancy Colour Centres in Diamond Using Plasma Immersion Ion Implantation (Apr. 10, 2019, last accessed May 5, 2025 at https://doi.org/10.1038/s41598-019-42323-6) (Year: 2019).*

(Continued)

*Primary Examiner* — Judy Nguyen
*Assistant Examiner* — Robert P Alejnikov, Jr.
(74) *Attorney, Agent, or Firm* — Christensen, Fonder, Dardi & Herbert PLLC; John P. Fonder

(57) ABSTRACT

Provided is a device based on ensemble nitrogen-vacancy centers, including: a right-angle prism; a dichroic parabolic condensing lens, a bottom opening oblique plane of the dichroic parabolic condensing lens is fixed on an oblique plane of the right-angle prism, and the dichroic parabolic condensing lens is configured to polarize the ensemble nitrogen-vacancy centers by an incident laser and collect a fluorescence signal at the ensemble nitrogen-vacancy center; a diamond, the diamond is a layered diamond, including a first face and a second face opposite to the first face, the first face is fixed at a top of a paraboloid of the dichroic parabolic condensing lens, and the second face includes the ensemble nitrogen-vacancy centers; a Lenz lens attached to the second face and configured to converge microwave magnetic field; a microwave coil located above the Lenz lens and config- (Continued)

ured to apply microwave magnetic field to the ensemble nitrogen-vacancy centers.

8 Claims, 4 Drawing Sheets

(58) Field of Classification Search
USPC ....................................................... 324/244.1
See application file for complete search history.

(56) References Cited

U.S. PATENT DOCUMENTS

| | | |
|---|---|---|
| 2011/0062957 A1 | 3/2011 | Fu et al. |
| 2016/0161429 A1* | 6/2016 | Englund ............ G01N 21/6402 324/304 |
| 2017/0023487 A1 | 1/2017 | Boesch |
| 2017/0343412 A1* | 11/2017 | Bruce ................... G01J 1/0425 |
| 2019/0178959 A1* | 6/2019 | Barry ...................... G01R 33/12 |
| 2020/0057117 A1* | 2/2020 | Nishibayashi ..... G01R 33/0017 |

FOREIGN PATENT DOCUMENTS

| | | | |
|---|---|---|---|
| CN | 109632861 A | | 4/2019 |
| CN | 110325869 A | | 10/2019 |
| CN | 111678896 A | | 9/2020 |
| CN | 211825695 U | * | 10/2020 |
| CN | 111896511 A | | 11/2020 |
| CN | 112180303 A | | 1/2021 |
| CN | 113093065 A | * | 7/2021 |
| CN | 113687279 A | * | 11/2021 |
| EP | 3 480 614 A1 | | 5/2019 |

OTHER PUBLICATIONS

PCT/CN2022/083333 Written Opinion of the International Searching Authority (Sep. 26, 2022) (Year: 2022).*
Mu, Shiwei, "Design and Study of High Pressure Magnetic Resonance Apparatus based on Diamond Nitrogen-vacancy Center," *Chinese Master's Theses Full-text Database, Basic Science*, No. 8, pp. 7-8 and 29-43 (Aug. 15, 2019).

* cited by examiner

DEVICE BASED ON ENSEMBLE NITROGEN-VACANCY CENTERS

CROSS-REFERENCE TO RELATED APPLICATIONS

This application is a Section 371 National Stage Application of International Application No. PCT/CN2022/083333, filed on Mar. 28, 2022, entitled "APPARATUS BASED ON ENSEMBLE NITROGEN-VACANCY COLOR CENTERS", the content of which is hereby incorporated by reference in its entirety.

TECHNICAL FIELD

The present disclosure relates to a field of a magnetic signal detection instrument, and in particular, to a device based on ensemble nitrogen-vacancy centers.

BACKGROUND

An ensemble of nitrogen-vacancy (NV) centers in diamond has been proven to have a significant advantage in magnetic field detection at a micrometer-nanometer scale. An electronic spin of the ensemble nitrogen-vacancy centers may be adjusted by microwaves and be initialized and read out through optical means. The ensemble nitrogen-vacancy centers have four different directions and may measure vector information of an external magnetic field. When detecting a nuclear magnetic resonance signal of an external sample, the sample may be stuck close to a thin ensemble NV layer, so that a nuclear magnetic resonance spectrometer made using the ensemble nitrogen-vacancy centers may detect an extremely small sample volume. Moreover, a diamond containing nitrogen-vacancy centers has excellent physical properties, chemical properties, and biocompatibility, which may be widely used in various extreme environments and biological-related magnetic signal measurements.

With reference to "Schloss, J. M., Barry, J. F., Turner, M. J., Walsworth, R. L., 2018 Simultaneous Broadband Vector Magnetometry Using Solid-State Spins. Phys. Rev. Applied 10, 034044.", in 2018, Jennifer M. Schloss, R. L. Walsworth and others utilized the ensemble nitrogen-vacancy centers in diamond to realize high sensitivity broadband vector detection of external magnetic fields, with a sensitivity of 50 $pT/Hz^{1/2}$ and a bandwidth of 12.5 kHz. With reference to "Xie, Y., Geng, J., Yu, H., Rong, X., Wang, Y., Du, J., 2020 Dissipative Quantum Sensing with a Magnetometer Based on Nitrogen-Vacancy Centers in Diamond. Phys. Rev. Applied 14, 014013.", in 2020, Xie Yijin et al. utilized the ensemble nitrogen-vacancy centers in diamond to realize high sensitivity and wider magnetic field detection in a case of continuous wave steady-state combined with phase-locked amplification method, with a sensitivity of 1.4 $nT/Hz^{1/2}$ and a bandwidth of 128 kHz, and then an ultra-high sensitivity of 195±60 $fT/Hz^{1/2}$ was achieved at a cost of lower bandwidth (1302 Hz) by combining a magnetic cluster.

In a test of nuclear magnetic signals, an excellent detection ability of the nitrogen-vacancy centers is more widely applied. With reference to "Glenn, D. R., Bucher, D. B., Lee, J., Lukin, M. D., Park, H., Walsworth, R. L., 2018. High-resolution magnetic resonance spectroscopy using a solid-state spin sensor. Nature 555, 351-354.", in 2018, Glenn, R. L. Walsworth and others used the ensemble nitrogen-vacancy centers in the diamond to detect the nuclear magnetic resonance spectrum of about 10 μL samples, and a broadening may reach 1 Hz level. On this basis, combined with the two-dimensional spectrum, hyperpolarization, and other technologies, a highly sensitive nuclear magnetic resonance method at the micrometer scale is developed.

Therefore, the ensemble nitrogen-vacancy centers in a diamond have high application value in the field of magnetic signal detection, including nuclear magnetic signal detection. However, a traditional structure based on ensemble nitrogen-vacancy centers mostly uses an objective to collect fluorescence signals from the nitrogen-vacancy centers. The fluorescence then passes a dichroic mirror, a focus lens, and a filter to reach a photoelectric detector, which will occupy a large space. At the same time, since such architecture requires fixing the diamond on structural support in advance, and fixing a collection portion of the lens (a few ensemble NV experimental architectures use other collection methods such as photoconductors and parabolic mirrors), a photoelectric diode and other structures. Therefore, an actual detection region will occupy a relatively large space, which not only restricts the robustness and integrity of the system but also is not conducive to operating in a narrow environment. Taking nuclear magnetic resonance detection as an example, a magnetic cavity that generates a uniformly strong magnetic field is generally small, and traditional architectures are substantially impossible to fit in. Increasing a volume of the magnetic cavity means a rapid increase in cost and magnet weight, which makes it very difficult to miniaturize a nuclear magnetic resonance spectrometer based on the ensemble nitrogen-vacancy centers.

SUMMARY

In view of this, the present disclosure provides a device based on ensemble nitrogen-vacancy centers for solving or partially solving the above problems.

The present disclosure provides a device based on ensemble nitrogen-vacancy centers, including: a right-angle prism; a dichroic parabolic condenser lens, where a bottom opening oblique plane of the dichroic parabolic condensing lens is fixed on an oblique plane of the right-angle prism, and the dichroic parabolic condensing lens is configured to polarize the ensemble nitrogen-vacancy centers by an incident laser and collect a fluorescence signal at the ensemble nitrogen-vacancy center; a diamond, where the diamond is a layered diamond, including a first face and a second face opposite to the first face, the first face is fixed on a top of a paraboloid of the dichroic parabolic condensing lens, and the second face includes the ensemble nitrogen-vacancy centers; a Lenz lens attached to the second face and configured to converge a microwave magnetic field; a microwave coil located above the Lenz lens and configured to apply the microwave magnetic field to the ensemble nitrogen-vacancy centers.

In an optional embodiment of the present disclosure, a side face of the dichroic parabolic condensing lens includes a vertical window face configured to allow the incident laser to enter.

In an optional embodiment of the present disclosure, the bottom opening oblique plane of the dichroic parabolic condensing lens is inclined with a horizontal plane to form an angle of 45 degrees.

In an optional embodiment of the present disclosure, the bottom opening oblique plane of the dichroic parabolic condensing lens is formed with a long pass dichroic film with a cutoff wavelength between a waveband of the incident laser and a waveband of the fluorescence signal.

In an optional embodiment of the present disclosure, a hole is provided at a center of the Lenz lens, and the Lenz lens is configured to measure a nuclear magnetic resonance signal of a sample in the hole.

In an optional embodiment of the present disclosure, a reflective film is formed on the second face and a side face of the right-angle prism.

In an optional embodiment of the present disclosure, the device based on the ensemble nitrogen-vacancy centers further includes: a filter configured to filter and remove the incident laser to obtain a filtered fluorescence signal; and a photoelectric detector configured to receive the filtered fluorescence signal.

In an optional embodiment of the present disclosure, the dichroic parabolic condensing lens is manufactured by using quartz or PDMS (Polydimethylsiloxane).

In an optional embodiment of the present disclosure, the Lenz lens is a circular metal sheet provided with a thin groove along a radial direction.

In an optional embodiment of the present disclosure, a side plane of the layered diamond is an oblique plane, wherein an area of the first face is greater than an area of the second face.

Figure 1:
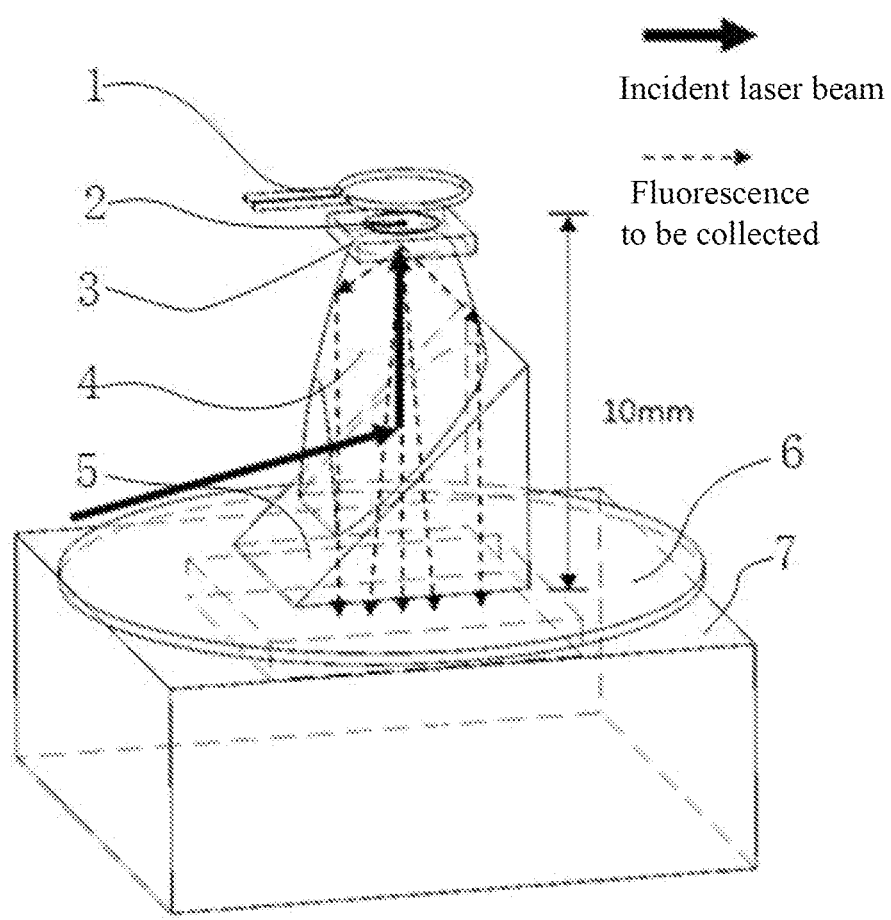
FIG. 1 schematically shows a schematic diagram of a device based on ensemble nitrogen-vacancy centers provided by an embodiment of the present disclosure.

Reference numerals are explained as follows:

1—Microwave coil; 2—Lenz lens; 3—Diamond; 4—Dichroic parabolic condensing lens; 5—Right-angle prism; 6—Filter; 7—Photoelectric detector.

DETAILED DESCRIPTION OF EMBODIMENTS

In order to make the purpose, technical solution, and advantages of the present disclosure more explicit, the present disclosure is further explained in detail as follows the following in conjunction with specific embodiments and with reference to the accompanying drawings. Apparently, embodiments described are only some embodiments of the present disclosure, rather than all embodiments. Based on the embodiments in the present disclosure, all other embodiments derived by those of ordinary skill in the art without creative labor, fall within the scope of protection of the present disclosure.

The terms used herein are only intended to describe specific embodiments and are not intended to limit the present disclosure. The terms "comprise", "include", "contain", etc., used herein indicate the existence of the described feature, step, operation and/or component, but do not exclude the existence or addition of one or more other features, steps, operations, or components.

In the present disclosure, unless otherwise specified and limited, the terms "install", "connect", "connected", "fix" and other terms should be broadly understood. For example, it may be a fixed connection, a detachable connection, or an integration. It may be a mechanical connection, an electrical connection, or a communication with each other. It may be directly connected or indirectly connected through an intermediate medium, which may be an internal connection between two components or an interaction relationship between two components. For those of ordinary skill in the art, specific meanings of the above terms in the present disclosure may be understood based on specific circumstances.

In the architecture of traditional experimental devices, a core portion is too large to operate in a narrow environment, such as lacking a miniaturized nuclear magnetic resonance spectrometer based on ensemble nitrogen-vacancy centers. At the same time, a separation of different portions in the traditional architecture leads to insufficient robustness. In order to solve the above problems, the present disclosure provides a miniaturized and integrated device based on ensemble nitrogen-vacancy centers, which combines a diamond, a collection portion, and a microwave control portion into a whole, with a high collection efficiency. In this way, a volume of the device will be further reduced. For example, in an embodiment of the present disclosure, an overall size of the device is about 3.7 cm*3.7 cm*3.5 cm. However, a diameter of a typical high NA objective lens is about 3 cm and a height of a typical high NA objective lens is about 5 cm. In use, a displacement table with sufficient degrees of freedom is further required to ensure that a position of the lens and a position of a diamond sample are adjustable. Even in a relatively compact design, a space of 5 cm*5 cm*10 cm is required. In addition, in an experiment of nuclear magnetic resonance, it is required to adjust a direction of an external magnetic field to be consistent with a certain main axis direction of nitrogen-vacancy centers. At this time, a surface of the diamond will form a fixed angle with the external magnetic field. For traditional architecture, more space and more complex designs are required to be embedded into a cavity of the magnet at an appropriate angle. However, the structure of the present disclosure only needs to reserve a path for an incident laser to operate normally. The device is based on the ensemble nitrogen-vacancy centers provided by the present disclosure, each portion of which forms a relatively fixed whole, so as to be used for a miniaturized and portable high-sensitivity magnetometer and microscopic nuclear magnetic spectrometer.

FIG. 1 schematically shows a schematic diagram of a device based on ensemble nitrogen-vacancy centers provided by an embodiment of the present disclosure. The present disclosure provides a device based on ensemble nitrogen-vacancy centers, including: a right-angle prism 5; a dichroic parabolic condensing lens 4, where a bottom opening oblique plane of the dichroic parabolic condensing lens is fixed on an oblique plane of the right-angle prism 5, and the dichroic parabolic condensing lens 4 is configured to polarize the ensemble nitrogen-vacancy centers by an incident laser and collect a fluorescence signal at the ensemble nitrogen-vacancy center; a diamond 3, where the diamond 3 is a layered diamond, including a first face and a second face opposite to the first face, the first face is fixed on a top of a paraboloid of the dichroic parabolic condensing lens, and the second face includes the ensemble nitrogen-vacancy centers; a Lenz lens 2 attached to the second face and configured to converge a microwave magnetic field; a microwave coil 1 located above the Lenz lens and configured to apply the microwave magnetic field to the ensemble nitrogen-vacancy centers. Optionally, the device based on the ensemble nitrogen-vacancy centers includes: a filter 6 configured to filter and remove the incident laser to obtain a filtered fluorescence signal; a photoelectric detector 7 configured to receive the filtered fluorescence signal.

In an optional embodiment provided by the present disclosure, the device based on the ensemble nitrogen-vacancy centers includes an excitation portion and a microwave control portion. The excitation portion is a specially designed optical structure, including a right-angle prism, a dichroic parabolic condensing lens, and a diamond. The microwave control portion is formed by a Lenz lens and a nearby microwave coil. The Lenz lens gathers a microwave magnetic field generated by the microwave coil to a center of the Lenz lens, thereby ultimately achieving a microwave control of the nitrogen-vacancy centers and a nuclear magnetic sample to be tested (when used as a nuclear magnetic resonance spectrometer).

For the excitation portion, a dichroic parabolic condensing lens (abbreviated as a parabolic lens) is a condensing lens formed by a parabolic surface and a bottom opening oblique plane, with a dichroic film formed on the surface of the dichroic parabolic condensing lens. The dichroic film divides a beam into a transmitted light and a reflected light based on a wavelength of the beam. The right-angle prism is located below the dichroic parabolic condensing lens, and an oblique plane of the right-angle prism is fixed together with the bottom opening oblique plane of the dichroic parabolic condensing lens. The diamond is a layered diamond including a first face and a second face opposite to the first face, where the second face includes ensemble nitrogen-vacancy centers. Optionally, the layered diamond includes an ultra-thin diamond, a bulk diamond containing a thin ensemble nitrogen-vacancy layer, and a bulk diamond filled with ensemble nitrogen-vacancy centers. The first face of the diamond is fixed on a top of the parabolic surface of the dichroic parabolic condensing lens. For example, low fluorescence adhesive or viscous liquid may be used to bond the diamond to a surface at the top of the parabolic surface of the dichroic parabolic condensing lens. It should be noted that the first face may also include ensemble nitrogen-vacancy centers, and in this case, it is not required to distinguish the first face from the second face during fixation.

The incident laser may be incident from a side of the dichroic parabolic condensing lens of the excitation portion, pass through a reflection of the bottom opening oblique plane of the dichroic parabolic condensing lens, and irradiate on a region of the ensemble nitrogen-vacancy centers of the diamond so that the ensemble nitrogen-vacancy centers are polarized and a fluorescence signal is emitted. At the same time, the fluorescence signal is collected by the parabolic surface of the dichroic parabolic condensing lens. Optionally, a polarization behavior of the nitrogen-vacancy centers and a size of the polarization region of the incident laser may be controlled by modulating the incident laser to change the power or focus of the incident laser.

In an optional embodiment of the present disclosure, a side face of the dichroic parabolic condensing lens includes a vertical window face configured to allow the incident laser to enter. The present disclosure reduces an impact on a quality of a light beam of the incident laser by cutting the vertical window face from the side face of the dichroic parabolic condensing lens.

In another optional embodiment of the present disclosure, the bottom opening oblique plane of the dichroic parabolic condensing lens is inclined with a horizontal plane to form an angle of 45 degrees. When the incident laser is injected in parallel, the incident laser may be reflected by the bottom opening oblique plane, thereby being perpendicular to the surface of the diamond to enter the diamond.

Optionally, the bottom opening oblique plane of the dichroic parabolic condensing lens is formed with a long pass dichroic film with a cutoff wavelength between a waveband of the incident laser and a waveband of the fluorescence signal. For example, when using a 532 nm wavelength laser to excite the nitrogen-vacancy center, a wavelength of the fluorescence signal is mainly no less than 650 nm and a long pass dichroic film with a cutoff wavelength of 605 nm may be selected. The long pass dichroic film has a higher reflectivity for a beam of which a wavelength is smaller than the cutoff wavelength and has a higher transmittance rate for a beam of which a wavelength is larger than the cutoff wavelength. By selecting the long-pass dichroic film with the cutoff wavelength between the waveband of the incident laser and the waveband of the fluorescence signal, the incident laser beam is reflected more to excite the nitrogen-vacancy centers of the diamond, and the fluorescence signal is transmitted to the tested instrument for reception. The bottom opening oblique plane of the dichroic parabolic condensing lens is further formed with an antireflective film, so as to reduce a reflection of the fluorescence signal.

In an optional embodiment of the present disclosure, a reflective film is formed on the second face and a side face of the right-angle prism. Alternatively, the side face of the layered diamond is an oblique plane, where an area of the first face is greater than an area of the second face. Nitrogen-vacancy centers on the second side of the diamond are polarized and emit a fluorescence signal. In order to improve the collection efficiency of the fluorescence signal, the present disclosure forms a reflective film on the second face of the diamond, so as to increase the reflection of the fluorescence signal on a second surface. At the same time, the side face of the layered diamond is provided as the above-mentioned oblique plane, so that the fluorescence signal from the oblique plane is reflected into the dichroic parabolic condensing lens, so as to reduce an escape of the fluorescence signal from the side face. It should be noted that the reflective film formed on the second surface may also be changed to other surface structures with reflective functions, which is conducive to the surface structures of fluorescence collection to further optimize the experimental effect, such as a small oblique plane, etc. Alternatively, a surface treatment that is beneficial for improving the NV center properties may also optimize the experimental effect. The above methods may be combined with each other or used separately.

Optionally, the present disclosure may also use the formation of an antireflective film to improve the efficiency of excitation or collection, such as an AOI 0 degree 350 nm to 700 nm antireflective film is formed on the window face on the side face of the dichroic parabolic condensing lens; an antireflection film is applied to the bottom of the right-angle prism with an angle of incidence (AOI) of 0 degrees, covering the wavelength range from 650 nm to 1050 nm; an antireflective film is deposited on the oblique surface of the same prism, featuring an AOI of 45 degrees and operating within the wavelength range of 650 nm to 1050 nm.

In another optional embodiment of the present disclosure, the dichroic parabolic condensing lens is manufactured by using quartz or PDMS. Requirements of the manufacturing process of the dichroic parabolic condensing lenses are relatively low, and quartz or PDMS may be used for mass manufacturing, thereby reducing a cost of individual components. Moreover, the manufactured products are less prone to damage compared to traditional optical structures, thereby further reducing the cost of use. It should be noted that the dichroic parabolic condensing lens manufactured by the present disclosure may also be manufactured using other hard and transparent materials.

An optional fixing method for the excitation portion of the present disclosure is: an opening oblique plane at the bottom of the parabolic lens is adhesively fixed on a center of an oblique plane of the right-angle prism, and the bottom face of the right-angle prism is adhesively fixed on a circular glass sheet.

For the microwave control portion, the microwave control portion is mainly formed by a Lenz lens and a microwave coil. The microwave is modulated and amplified into the microwave coil, which is fixed at the top of the parabolic lens. The Lenz lens converges the microwave and ultimately acts on the region of the nitrogen-vacancy centers of the diamond.

In an optional embodiment of the present disclosure, the center of the Lenz lens is provided with a hole, and the Lenz lens is configured to measure a nuclear magnetic resonance signal. During a nuclear magnetic resonance, the sample may be directly placed into a small hole and in contact with the surface of the diamond. Optionally, the Lenz lens is a circular metal sheet provided with a thin groove along a radial direction. The Lenz lens may be processed on a surface of a quartz film and then fixed on the surface of the diamond for good adhesion. The Lenz lens has a function of focusing a surrounding microwave magnetic field, so that the Lenz lens may provide a relatively strong control field. At the same time, due to a passive characteristics of the Lenz lens, the heat transferred to the surface of the diamond is relatively small, so as to minimize the impact of temperature on the nitrogen-vacancy center, stability of an optical system and the nuclear magnetic sample to be tested.

Figure 2:
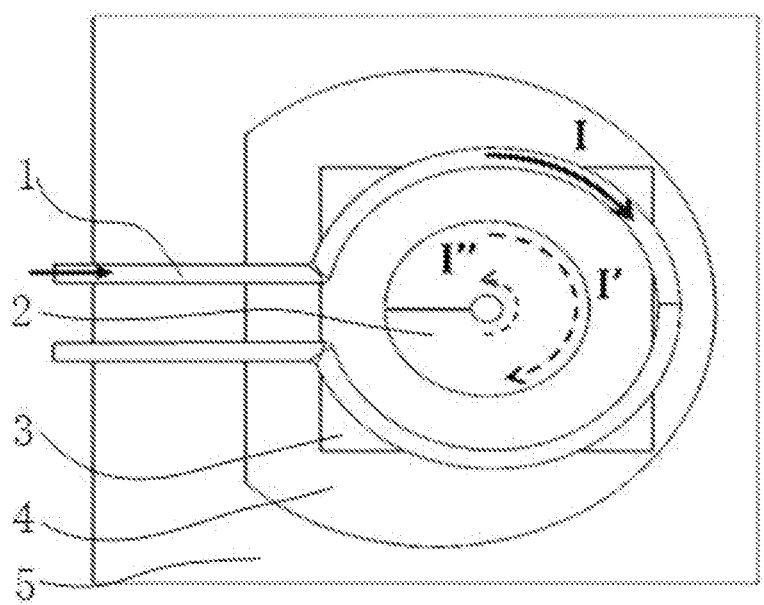
FIG. 2 schematically shows a view of a device based on ensemble nitrogen-vacancy centers provided by an embodiment of the present disclosure.

It should be noted that there may be a plurality of embodiments of the Lenz lens, such as a circular solid metal sheet as shown in FIG. 2. There is a small hole in the middle of the circular solid metal sheet, along with a small groove that is connected to the hole and extends radially. The groove lacks metal coverage, meaning it is non-conductive. In other embodiments, the size and number of circular metal, small holes, and thin grooves may be appropriately changed. For example, a plurality of thin grooves may be left along a plurality of radial directions (such as an opposite direction), the solid metal sheet may also be a ring-shaped structure surrounded by wires, and the Lenz lens may also be a thin metal sheet attached to the surface of the diamond or a membrane formed on a surface layer processed on a substrate (such as a circular quartz substrate). In addition, a coverage region of the Lenz lens may be generated through computer-aided optimization, so as to meet specific requirements or achieve a better magnetic focusing effect.

The microwave coil may be selected as an untuned single-turn coil or a tuned or structurally designed microwave coil. The microwave coil may be used independently or in conjunction with heat pipes, fins, and other heat dissipation substrates to reduce an impact of coil heating.

In an optional embodiment of the present disclosure, the device based on the ensemble nitrogen-vacancy centers further includes: a filter configured to filter and remove the incident laser to obtain a filtered fluorescence signal; and a photoelectric detector configured to receive the filtered fluorescence signal. A fluorescence signal emitted by the excitation portion of the ensemble nitrogen-vacancy centers of the device provided by the present disclosure is collected by the dichroic parabolic condensing lens. After that, the fluorescence signal emits downwards through the bottom opening oblique plane of the dichroic parabolic condensing lens. The fluorescence signal is received by a photoelectric detector, and the fluorescence signal is read out by the photoelectric detector. Before the photoelectric detector receives the fluorescence signal emitted from the bottom surface of the right-angle prism, the fluorescence signal first passes through the filter. The filter may be a single or multiple-layer filter. The photoelectric detector may be selected as a photoelectric detector integrated with a photoelectric diode and an amplification circuit, such as Thorlabs PDAPC2, or a separate photoelectric diode that uses wires to transmit signals to the amplification circuit for subsequent processing.

Figure 3:
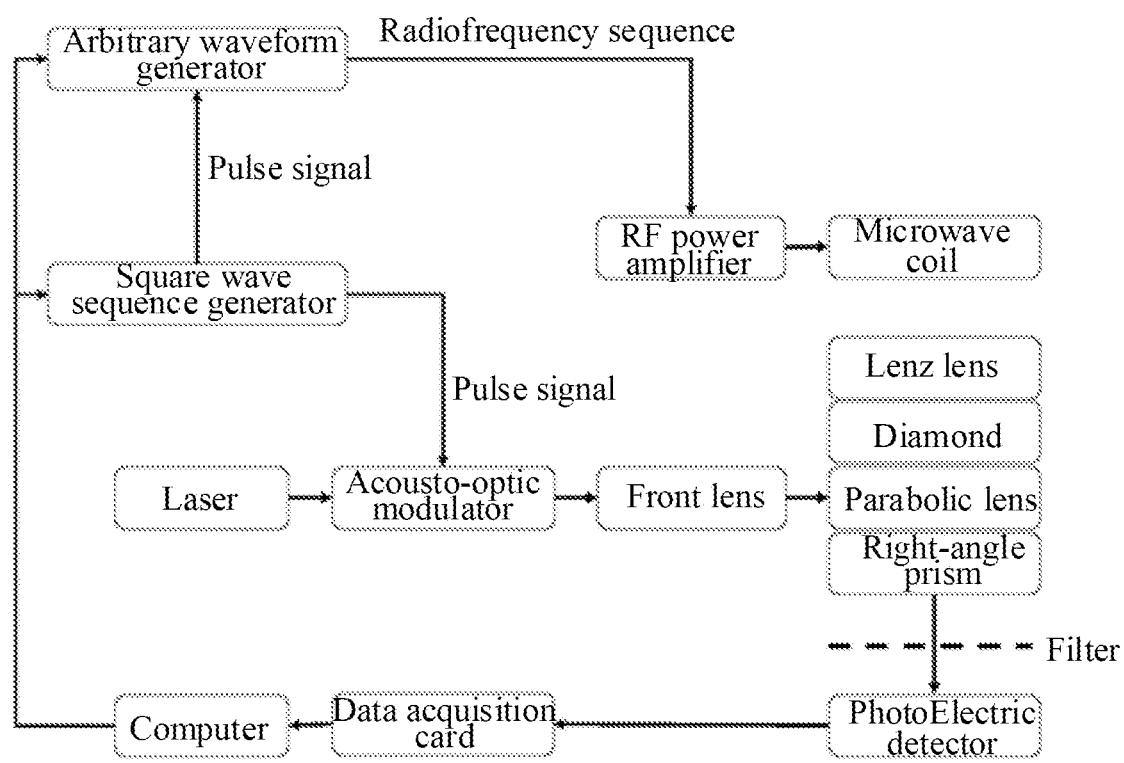
FIG. 3 schematically shows a schematic diagram of an experimental application of a device based on ensemble nitrogen-vacancy centers provided by an embodiment of the present disclosure.

With reference to FIG. 3, FIG. 3 schematically shows a schematic diagram of an experimental application of a device based on ensemble nitrogen-vacancy centers provided by an embodiment of the present disclosure. This experiment is specifically a small integrated experimental device based on the diamond ensemble nitrogen-vacancy centers, by taking a pulse experimental application as an example, but it is also suitable for a continuous wave application. A computer controls a square wave sequence generator to generate pulse sequence signals to synchronize the timing of microwave and laser sequences. An acousto-optic modulator is controlled by a pulse signal, which affects an on-off of the laser optical path, and generates a pulse laser sequence for a repeated polarization of the nitrogen-vacancy centers. An arbitrary waveform generator loads the microwave sequence of the experiment, and the arbitrary waveform generator is controlled by the pulse signal to output a microwave signal, and the microwave signal is amplified by a power amplifier to control spins of the ensemble nitrogen-vacancy centers. The fluorescence signal of the nitrogen-vacancy centers in diamond is collected by the parabolic lens, entered into the photoelectric detector through the filter, and read out by a data acquisition card. When the device is used as a small nuclear magnetic spectrometer, another radiofrequency signal may be coupled in the electronic system, so that the microwave coil may simultaneously generate a control field that conforms to a Raman precession frequency of a nuclear spin to be tested, so as to control the nuclear spin in the nuclear magnetic sample to be tested.

In a specific embodiment of the present disclosure, a principle is as follows: an incident laser enters a side face of a parabolic lens near from a horizontal direction and is reflected at a bottom opening oblique plane formed with a dichroic film, and the incident laser irradiates in a vertical direction on a center of a central opening of a Lenz lens. If the laser before the incident is properly focused and reduced, it is possible to enhance the optical power density sensed by the nitrogen-vacancy centers, improve the polarization effect, and simultaneously enhance the uniformity of spin driving. In a specific embodiment, a distance between the surface of the diamond and a bottom surface of the right-angle prism is about 10 mm. The fluorescence signal generated by the ensemble nitrogen-vacancy centers is collected by the parabolic lens, then passes through a lower right-angle face of the right-angle prism, passes through the filter, and is read out by the lower photoelectric detector. A principle of magnetic focusing of the Lenz lens is shown as a top view in FIG. 2. A larger microwave coil at the top is passed through by an alternating current I, and the alternating current I excites and generates a microwave magnetic field. The lower Lenz lens is a circular metal sheet provided with a small hole in the center and a thin groove. An outer ring of the metal sheet senses the microwave magnetic field generated by the coil, which generates an induced current I', while an inner ring forms a current conservation circuit with the outer ring, which generates an opposite current I". In this way, since the diameter of the inner ring is much smaller than the diameter of the outer ring, it is equivalent to focusing the microwave magnetic field sensed by the outer ring on a very small region inside, thereby playing a role of "magnetic focusing".

Figure 4:
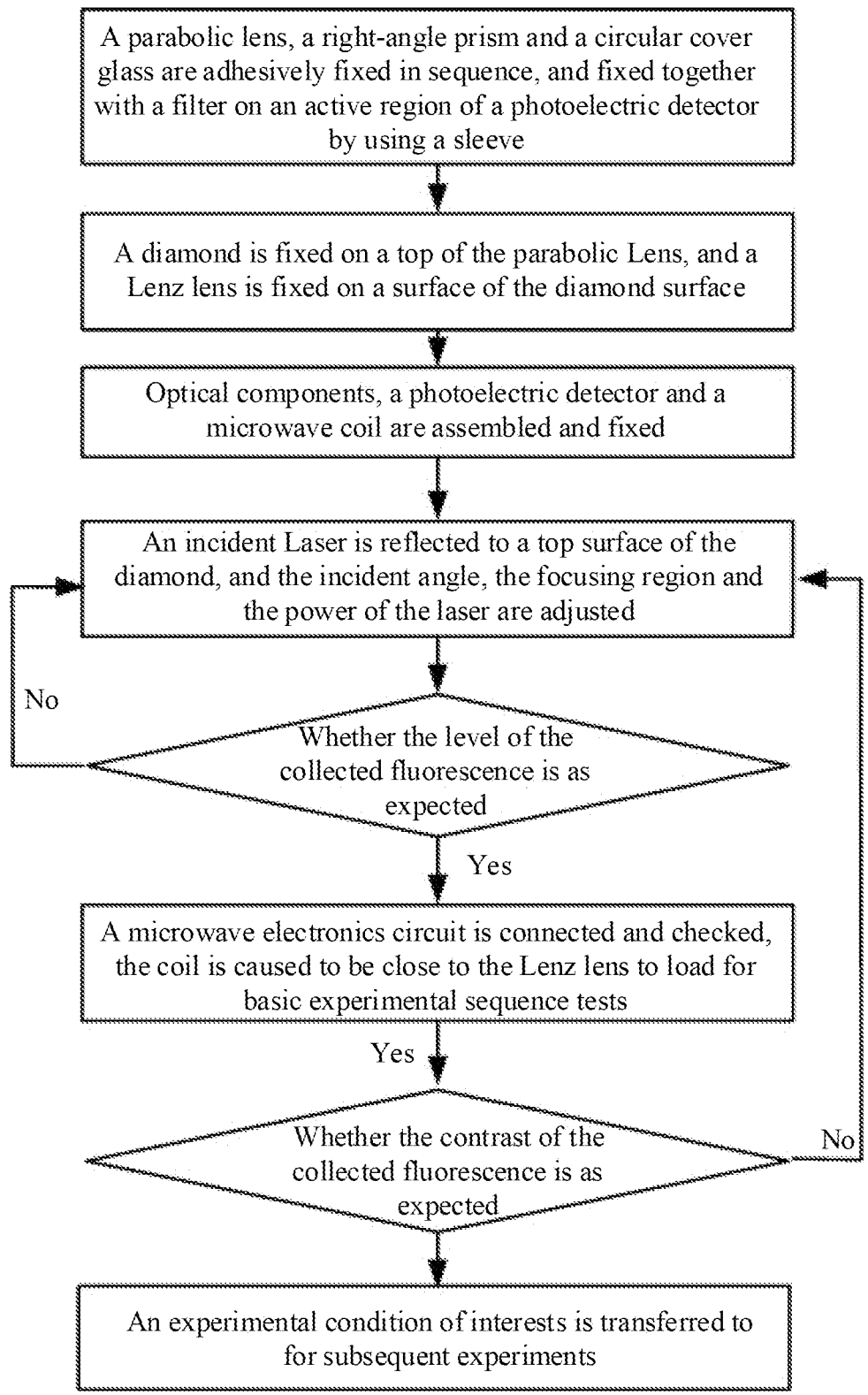
FIG. 4 schematically shows a usage flowchart of a device based on ensemble nitrogen-vacancy centers provided by an embodiment of the present disclosure.

Another embodiment of the present disclosure provides a usage process of a device based on ensemble nitrogen-vacancy centers, as shown in FIG. 4.

FIG. 4 schematically shows a usage flowchart of a device based on ensemble nitrogen-vacancy centers provided by an embodiment of the present disclosure.

The core portions of the device are assembled, such as the parabolic lens and the right-angle prism are adhesively fixed in the above way, the right-angle face of the right-angle prism is adhesively fixed on a circular cover glass, and the core portions and the filter are fixed together above the active region of the photoelectric detector by using a snap ring sleeve. During assembly, it is required to ensure that the centers of the parabolic lens, the right-angle prism, the filter, and the active region of the photoelectric detector are substantially aligned, and the above components are fixed to each other using adhesive methods, snap rings, and sleeves.

The diamond and the Lenz lens are fixed. It is noted that if the nitrogen-vacancy centers are only distributed on the second face of the diamond, the second face is required to face away from the top face of the parabolic lens and attach to the Lenz lens, so as to improve an intensity of the control field and increase collection efficiency.

After the above components are properly assembled, the incident laser is injected from the side face of the parabolic lens that is vertically cut. At this time, the incident laser is reflected by the dichroic film on the bottom opening oblique plane and relatively vertically entered the diamond, while an intensity of the fluorescence signal is observed on an oscilloscope or a data acquisition card. If the fluorescence intensity is normal, basic experimental sequences such as continuous wave ODMR or Ramsey sequences are loaded for tests. After observing a control of the nitrogen-vacancy centers by the experimental sequence, a contrast of fluorescence changes, if normal, it may be transferred to specific conditions (such as in a uniform magnetic field) for specific experiments (such as nuclear magnetic signal testing or being used as a vector magnetometer). If the contrast is poor, it is required to check whether an optical power density of the incident laser (determined by the size of the focusing area and laser power) is too low, whether a light spot is at the center of the lens, whether there are problems with the microwave electronics circuit, and whether the microwave coil is too far from the Lenz lens or off center.

The device based on ensemble nitrogen-vacancy centers provided by the present disclosure fixes four parts of polarization, controlling, fluorescence collection and even reading out in ensemble nitrogen-vacancy centers experiment into a whole, so as to realize an integration of ensemble nitrogen-vacancy centers experimental device. In addition, a combination structure of Lenz lens-dichroic parabolic condensing lens-right-angle prism was adopted, with a combined size of no more than 10 mm, so as to realize miniaturization of the ensemble NV centers experimental device. Such device benefits from characteristics such as miniaturization, integration, easy assembly, and has strong robustness. It is possible to be easily transferred to other experimental environments after testing the device effect and the properties of the ensemble nitrogen-vacancy centers in general environments.

In the description of the present disclosure, it should be understood that an orientation or position relationship indicated by terms such as "longitudinal", "length", "circumferential", "front", "back", "left", "right", "top", "bottom", "inside", "outside", etc. and other positions, is just to facilitate the description of the present disclosure and simplify the description, based on the orientation or position relationship shown in the figures. However, these terms do not indicate and suggest devices or components referred to that must have a specific orientation or construction or operate in a specific orientation, so it should not be understood as a limitation on the scope of protection of the present disclosure.

Similarly, in order to simplify the present disclosure and assist in understanding one or more aspects of the present disclosure, in the description of exemplary embodiments of the present disclosure above, various features of the present disclosure are sometimes grouped together into a single embodiment, diagram, or description thereof. The reference terms "one embodiment", "some embodiments", "example", "specific example", or "some examples" are intended to indicate specific features, structures, materials, or characteristics described in conjunction with the embodiment or example being included in at least one embodiment or example of the present disclosure. In the specification, the schematic representation of the above terms does not necessarily refer to the same embodiment or example. In addition, the specific features, structures, materials or characteristics described may be combined in any one or more embodiments or examples in an appropriate manner.

In addition, the terms "first" and "second" are only used to describe the purpose and cannot be understood as indicating or implying relative importance or implying the number of technical features indicated. Therefore, the features defined as "first" and "second" may explicitly or implicitly include one or more of these features. In the description of the present disclosure, "multiple" means at least two, such as two, three, etc., unless otherwise specifically defined.

The specific embodiments mentioned above provide a further detailed explanation of the purpose, technical solution, and beneficial effects of the present disclosure. It should be understood that the above are only specific embodiments of the present disclosure and are not intended to limit it. Any modifications, equivalent replacements, improvements, etc. made within the spirit and principles of the present disclosure should be included in the scope of protection of the present disclosure.

What is claimed is:

1. A device based on ensemble nitrogen-vacancy centers, comprising:
   a right-angle prism;
   a dichroic parabolic condensing lens, wherein a bottom opening oblique plane of the dichroic parabolic condensing lens is fixed on an oblique plane of the right-angle prism, and the dichroic parabolic condensing lens is configured to polarize the ensemble nitrogen-vacancy centers by an incident laser and collect a fluorescence signal at the ensemble nitrogen-vacancy centers;
   a diamond, wherein the diamond is a layered diamond, comprising a first face and a second face opposite to the first face, the first face is fixed on top of a paraboloid of the dichroic parabolic condensing lens, and the second face comprises the ensemble nitrogen-vacancy centers;

a Lenz lens attached to the second face and configured to converge a microwave magnetic field;

a microwave coil located above the Lenz lens and configured to apply the microwave magnetic field to the ensemble nitrogen-vacancy centers, wherein a hole is provided at a center of the Lenz lens, and the Lenz lens is configured to measure a nuclear magnetic resonance signal of a sample in the hole.

2. The device of claim 1, wherein a side face of the dichroic parabolic condensing lens comprises a vertical window face configured to allow the incident laser to enter.

3. The device of claim 1, wherein the bottom opening oblique plane of the dichroic parabolic condensing lens is inclined with a horizontal plane to form an angle of 45 degrees.

4. The device of claim 1, wherein the bottom opening oblique plane of the dichroic parabolic condensing lens is formed with a long pass dichroic film with a cutoff wavelength between a waveband of the incident laser and a waveband of the fluorescence signal.

5. The device of claim 1, wherein the device based on ensemble nitrogen-vacancy centers further comprises:

a filter configured to filter and remove the incident laser to obtain a filtered fluorescence signal;

a photoelectric detector configured to receive the filtered fluorescence signal.

6. The device of claim 1, wherein the dichroic parabolic condensing lens is manufactured by using quartz or PDMS (Polydimethylsiloxane).

7. The device of claim 1, wherein the Lenz lens is a circular metal sheet provided with a thin groove along a radial direction.

8. A device based on ensemble nitrogen-vacancy centers, comprising:

a right-angle prism;

a dichroic parabolic condensing lens, wherein a bottom opening oblique plane of the dichroic parabolic condensing lens is fixed on an oblique plane of the right-angle prism, and the dichroic parabolic condensing lens is configured to polarize the ensemble nitrogen-vacancy centers by an incident laser and collect a fluorescence signal at the ensemble nitrogen-vacancy centers;

a diamond, wherein the diamond is a layered diamond, comprising a first face and a second face opposite to the first face, the first face is fixed on top of a paraboloid of the dichroic parabolic condensing lens, and the second face comprises the ensemble nitrogen-vacancy centers;

a Lenz lens attached to the second face and configured to converge a microwave magnetic field;

a microwave coil located above the Lenz lens and configured to apply the microwave magnetic field to the ensemble nitrogen-vacancy centers, wherein a side plane of the layered diamond is an oblique plane, and wherein an area of the first face is greater than an area of the second face.

* * * * *